(12) United States Patent
Kumar et al.

(10) Patent No.: US 6,356,921 B1
(45) Date of Patent: Mar. 12, 2002

(54) FRAMEWORK FOR PROGRESSIVE HIERARCHIAL AND ADAPTIVE DELIVERY RICH MEDIA PRESENTATIONS AND ASSOCIATED META DATA

(75) Inventors: Keeranoor Kumar, Peekskill; James Lipscomb, Yorktown Heights; Jai Menon, Croton-On-Hudson, all of NY (US); Arun Ramchandra, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/268,537

(22) Filed: Mar. 12, 1999

Related U.S. Application Data

(63) Continuation-in-part of application No. 09/100,418, filed on Jun. 20, 1998, now Pat. No. 6,230,162.

(51) Int. Cl.$^7$ ............................................. G06F 17/30
(52) U.S. Cl. ................... 707/501.01; 707/104; 707/102
(58) Field of Search ........................... 707/501.01, 513, 707/102, 104; 709/303, 224; 704/243, 247; 345/866, 302, 335, 9; 700/90; 386/52; 717/11; 705/26, 219, 27; 711/114

(56) References Cited

U.S. PATENT DOCUMENTS 5,428,731 A 6/1995 Pawers, III .............. 707/501.1
5,469,206 A 11/1995 Strubbe et al. ............... 725/60

(List continued on next page.)

Primary Examiner—Sanjiv Shah
(74) Attorney, Agent, or Firm—Steven J. Meyers

(57) ABSTRACT

A single file contains all information for a complete presentation. Each presentation file contains both data and software for the presentation. It includes both the data and software provided to the user and that retained by the server for the performance of the presentation. The basic building block for a presentation is a frame. The presentation file can contain a file header frame and multiple media frames, and one or more meta data frame. Of the frame types, the file header frame is the only one whose presence is mandatory in the presentation file format. The file header frame identifies the subject matter and contents of the presentation file providing information on the media types and total length of the file. The most degenerate yet useful version of a presentation file would have the file header frame followed by a media frame containing a thumbnail description. A thumbnail description may constitute a simple still picture or written description of the subject matter. Other media frames can be animated or full motion descriptions of the subject matter. Meta data frames are frames that contain non-media specific data file level behavior and user information. Meta data frames are presented only in cases where non-fault behavior and configuration are desired or in cases where actions and abstract navigational semantics are to be incorporated.

24 Claims, 13 Drawing Sheets

U.S. PATENT DOCUMENTS

| | | | |
|---|---|---|---|
| 5,485,280 A | 1/1996 | Fujinami et al. | 386/123 |
| 5,528,490 A | 6/1996 | Hill | 717/11 |
| 5,551,021 A | 8/1996 | Harada et al. | 707/104.1 |
| 5,621,660 A | 4/1997 | Chaddha et al. | 704/247 |
| 5,644,324 A | 7/1997 | Maguire, Jr. | 345/9 |
| 5,675,752 A * | 10/1997 | Scott et al. | 345/866 |
| 5,696,869 A | 12/1997 | Abecasses | 386/52 |
| 5,706,290 A | 1/1998 | Shaw et al. | 370/465 |
| 5,706,486 A | 1/1998 | Cruz et al. | 713/510 |
| 5,710,887 A | 1/1998 | Chelliah et al. | 705/26 |
| 5,719,786 A | 2/1998 | Nelson et al. | 705/219 |
| 5,721,832 A | 2/1998 | Westrape et al. | 705/27 |
| 5,727,048 A | 3/1998 | Hiroshima et al. | 379/93.12 |
| 5,732,239 A | 3/1998 | Tabagi et al. | 711/114 |
| 5,781,190 A * | 7/1998 | Gorbet et al. | 345/355 |
| 6,005,560 A * | 12/1999 | Gill et al. | 345/302 |
| 6,161,137 A * | 12/2000 | Ogdon et al. | 709/224 |
| 6,167,404 A * | 12/2000 | Morcos et al. | 707/102 |
| 6,233,620 B1 * | 5/2001 | Gish | 709/303 |
| 6,243,676 B1 * | 6/2001 | Witteman | 704/243 |
| 6,243,713 B1 * | 6/2001 | Nelson et al. | 707/104 |
| 6,269,275 B1 * | 7/2001 | Slade | 700/90 |
| 6,275,833 B1 * | 8/2001 | Nakamura et al. | 707/513 |

* cited by examiner

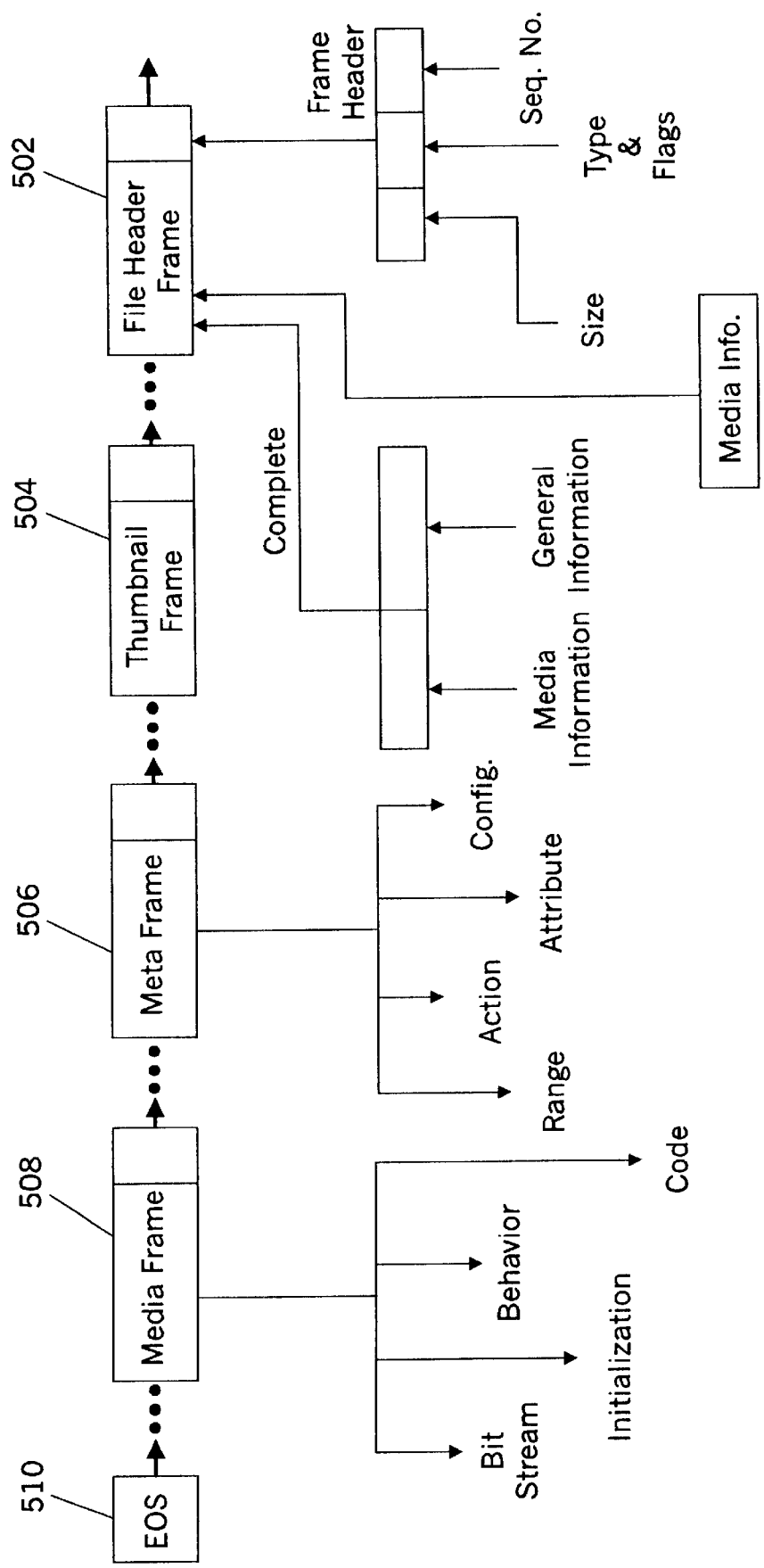

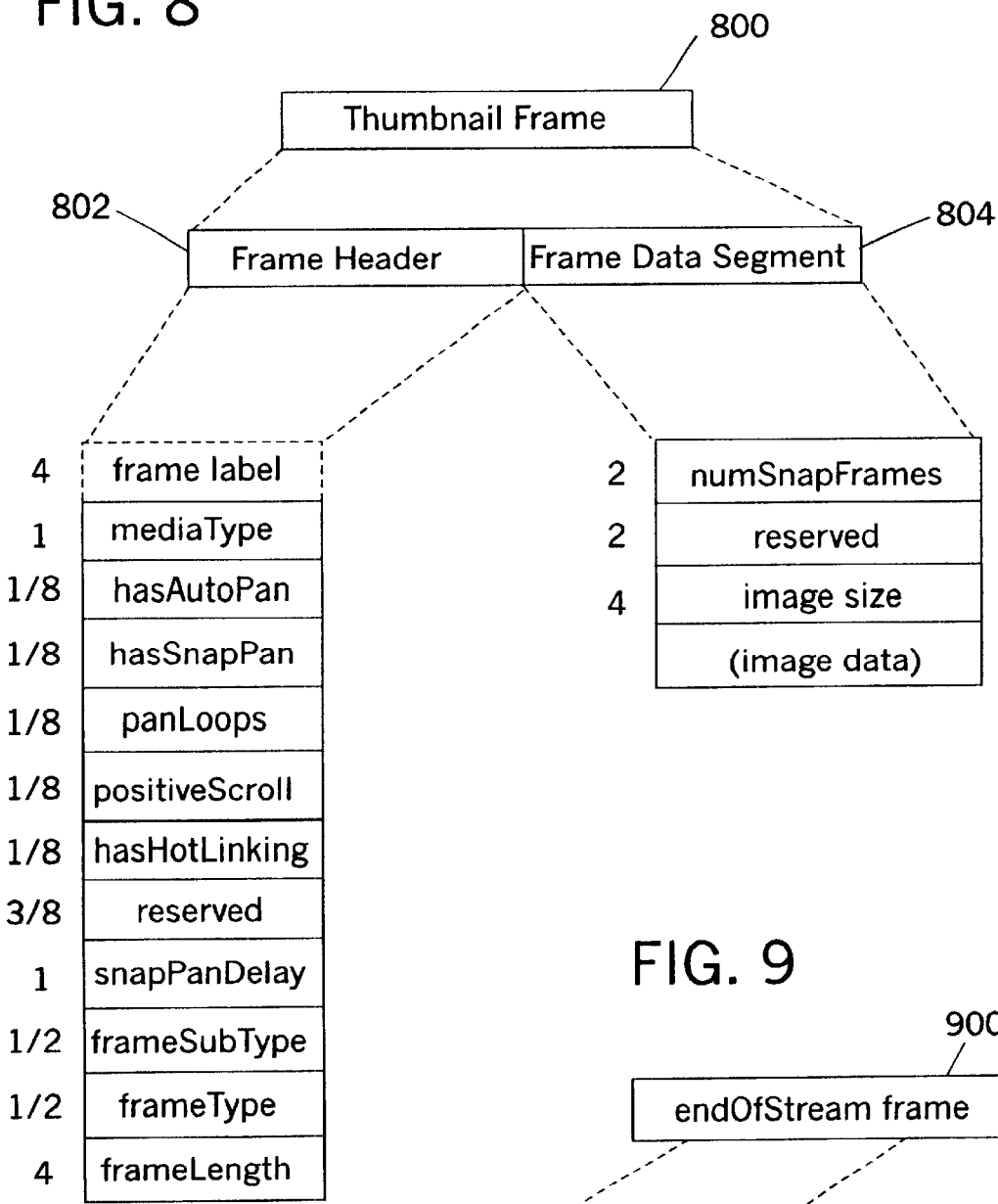
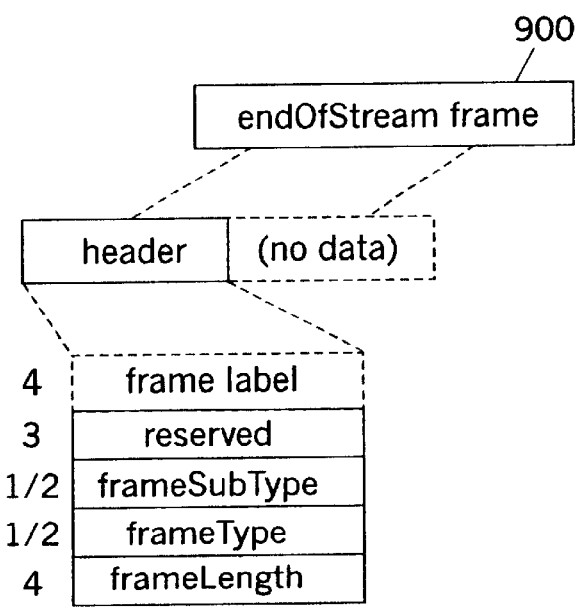
FIG. 8
FIG. 9

FRAMEWORK FOR PROGRESSIVE HIERARCHIAL AND ADAPTIVE DELIVERY RICH MEDIA PRESENTATIONS AND ASSOCIATED META DATA

RELATED APPLICATIONS

This application is a continuation-in-part of U.S. patent application Ser. No. 09/100,418 now U.S. Pat. No. 6,230,162 filed on Jun. 20, 1998 and entitled "Progressive Interleaved Delivery of Interactive Descriptions & Renderers for electronic Publishing of Merchandise", and of U.S. patent application Ser. No. 09/169,836 filed Oct. 9, 1998 now pending and entitled "Personalizing Rich Media Presentations Based on User Response to the Presentation".

FIELD OF THE INVENTION

The present invention relates to providing media descriptions of objects on the internet and more particularly, to the configuration of code and data in the delivery of Rich Media Presentations.

BACKGROUND OF THE INVENTION

The internet is capable of presenting rich media presentations, containing still images, animated images, video images and audio. One problem with these presentations, is the need to transmit large blocks of code and data to the client. This is a serious impediment for presenting products to electronic commerce customers who are typically connected over low-bandwidth dial-up links They cannot be expected to pre-load code and data or wait for very long before their shopping experiences commence. This problem is addressed in the above referenced copending U.S. patent application Ser. No. 09/100,418, entitled "Progressive Interleaved Delivery of Interactive Descriptions & Renderers for Electronic Publishing of Merchandise" filed Jun. 20, 1998. This copending application is hereby incorporated by reference.

A second problem concerns optimized delivery of various rich media to easily and effectively address the right amount of information about the merchandise to each user. Each user has different interests, needs and expectations. The presentations must be able to attract and maintain the attention of users with a wide variety of interests and needs, different personalities and varying attention spans. Gathering and presenting information for these and other purposes needed by the user to express his or her selection preferences is difficult with presently available approaches. This problem is addressed by the above referenced U.S. patent application Ser. No. 09/169,836. This copending application is hereby incorporated by reference.

Another problem that exists is the organizing of multiple files for presenting a rich media presentation. Usually, various files exist for different portions of a presentation. The tying together of these files to provide a tailored presentation to users presents significant organizational problems. Further, transmitting of files from one server say that in the United States to one in Europe is time consuming and complex. Real time response to a user's needs by searching files in the United States with a European server would consume considerable server capacity and require an inordinate amount of time to obtain the desired presentation. Examination of existing formats such as MPEG-4, Quick time and ASF reveal that each fails to meet some of the requirements to provide rich media presentations.

Therefore, an object of the present invention is to provide an new arrangement of presentation files with rich media presentations.

Another object of the present invention is to encapsulate data and files needed for presentation so as to simplify their accessing and transport.

BRIEF DESCRIPTION OF THE INVENTION

In accordance with the present invention, a single file contains all information for complete presentation. Each presentation file can contain both data and software for the presentation. It includes both the data and software provided to the user and that retained by the server for the performance of the presentation. The basic building block of a presentation file is a data frame. The presentation file can contain a file header frame, multiple media frames and one or more meta data frames. The file header frame is the only one whose presence is mandatory in the presentation file format. The file header frame identifies the subject matter and contents of the presentation file providing information on the total size of the file and a definition of media tracks in the file. The most degenerate yet useful version of a presentation file would have the file header frame followed by a media frame containing a thumb nail description. A thumbnail description may constitute a simple picture or description of the subject matter. Other media frames can be animated or full motion descriptions of the subject matter. Meta data frames are frames that contain non-media specific data file level behavior and user interface information, such as range actions, attributes. Meta Data Frames are presented only in cases where non-fault behavior and configuration are desired or in cases where actions and abstract navigational semantics are to be incorporated.

This arrangement is a suitable delivery format even over low bandwidth connections, providing for a progressive and streamed delivery. It enables easy inclusion of new media types and the modification of existing frames. The file not only contains media and meta data, but include description information user and server code making the file quite self contained and portable.

BRIEF DESCRIPTION OF THE DRAWINGS

A better understanding of the invention can be had by the following description of one embodiment thereof while referring to the accompanying figures of which:

FIG. 5 is a graphic representation of the data in a presentation file;

FIG. 8 is a diagram of a thumbnail frame;

FIG. 9 is a diagram of an end of stream frame;

DETAILED DESCRIPTION OF THE INVENTION

Figure 1:
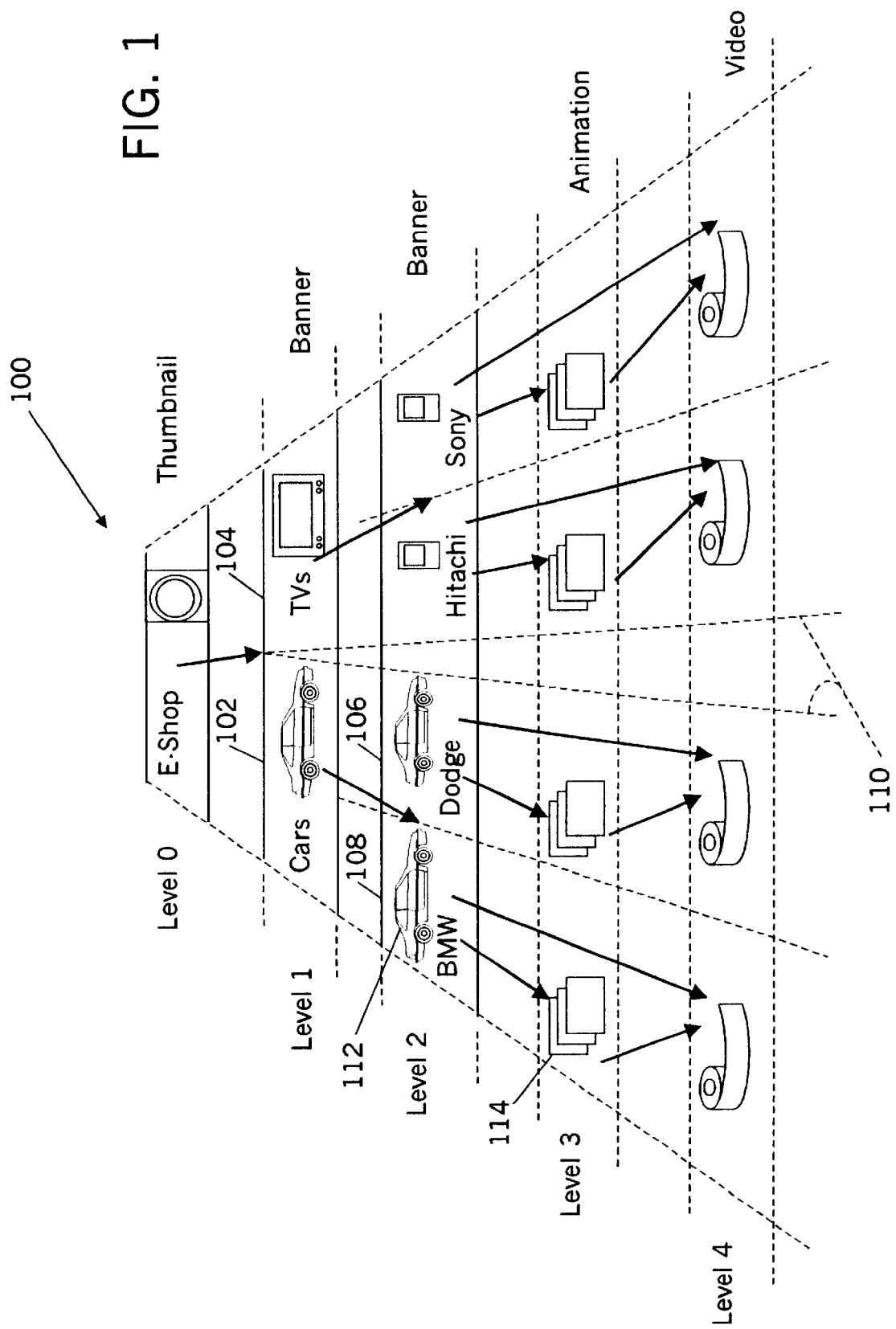
FIG. 1 is a schematic diagram which shows material available at a typical internet site.

FIG. 1 shows a hierarchical description of a portion of the articles being offered for sale at a website. Description level 0 shows the various goods available at the site. To begin with, only level 0 information is loaded into a user's machine. While not loading level 1 and level 2 information until a user As shown in FIG. 1, a variety of goods may be offered at a single website 100. It could include motor vehicles 102 along with television sets 104 and other goods. The motor vehicles includes vans 106, four door sedans 108 and accessories (not illustrated). The possible selections would be illustrated by thumbnail descriptions at the level 0 web pages of the website. The illustrated goods are only representative of the possible selections on the website.

The set of two dashed vertical lines 110 that separate the illustrated motor vehicles from the television sets, indicates that these level 1 items are not adjacent items in the browsable sequence, but are separated by segments of data for other items offered at the website. Goods or the browsable sequence are linked by some semantic relationship. For instance, the van 106 is linked semantically to the sedan 108 by a "similar to" relationship. While accessories are linked semantically to sedans 108 by a "benefits from" relationship. The user being presented, on the screen in level 0, with the level 1 choices, selects what he or she is interested in: say, the purchase of a motor vehicle 102 as opposed to a television set 104. Then, transitioning down from level 1 to level 2 by making a selection within the sedan category transitions are possible across the dashed horizontal lines following an "is a" semantic link. Thus, upon selection of the four-door sedan category, the user is presented with the next level of selections within that category. The level 2 descriptions cover a wide selection of four-door sedans divided into price categories (possible choices could include an inexpensive Chevy, or medium priced Toyota and the illustrated expensive BMW 112). Banner presentations at level 1 and level 2 aid in the selection process. Let us assume the user selects the expensive BMW. As provided for in the aforementioned copending application, as the user is proceeding through the process of selection, the material for the presentation is being loaded into the user's computer. Once the BMW sedan has been selected, the computer is ready to present as a level 3 description either an animation presentation 114 or a video presentation of the selected sedan.

An act of the user with respect to the presentation contains information the user intends to be conveyed by the act. However, other information not intended to be conveyed may be implied from the act. For instance, the choice of the BMW by the user not only explicitly states his interest in that four-door sedan, but can also indicate a price range that he or she is interested in. The selection of the BMW could indicate that the user is interested in an expensive car like a BMW and not in a less expensive one, such as the small Chevrolet or Toyota sedan. If the user's actions indicates the user is losing interest in the BMW sedan, he or she is more likely to be interested in another high priced luxury car. Therefore, anticipatory loading of presentations and displaying of banners should be for those of other luxury cars. These presentations include pre-priced presentations such as one for the BMW sedan shown in FIG. 1. That presentation file would contain all code and data for the various levels including thumbnail descriptions of level 0, the banner descriptions of levels 1 and 2, and the animation and video descriptions of levels 3 and 4, respectively. It could also include banner for other "similar to" vehicles such as other high priced sedans.

Figure 2:
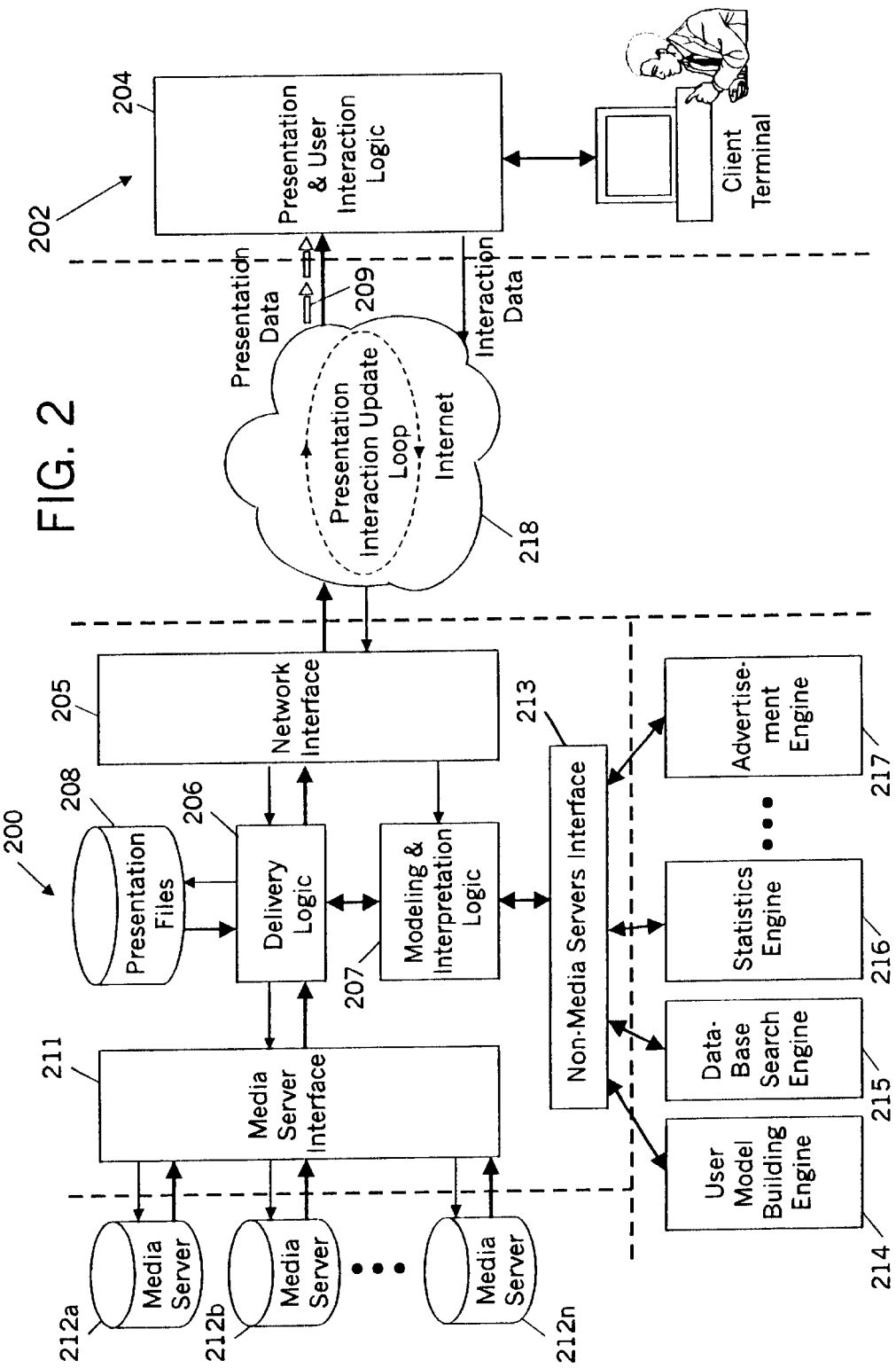
FIG. 2 is a block diagram showing a network server in accordance with the present invention connected to a client terminal on the internet.
Figure 3:
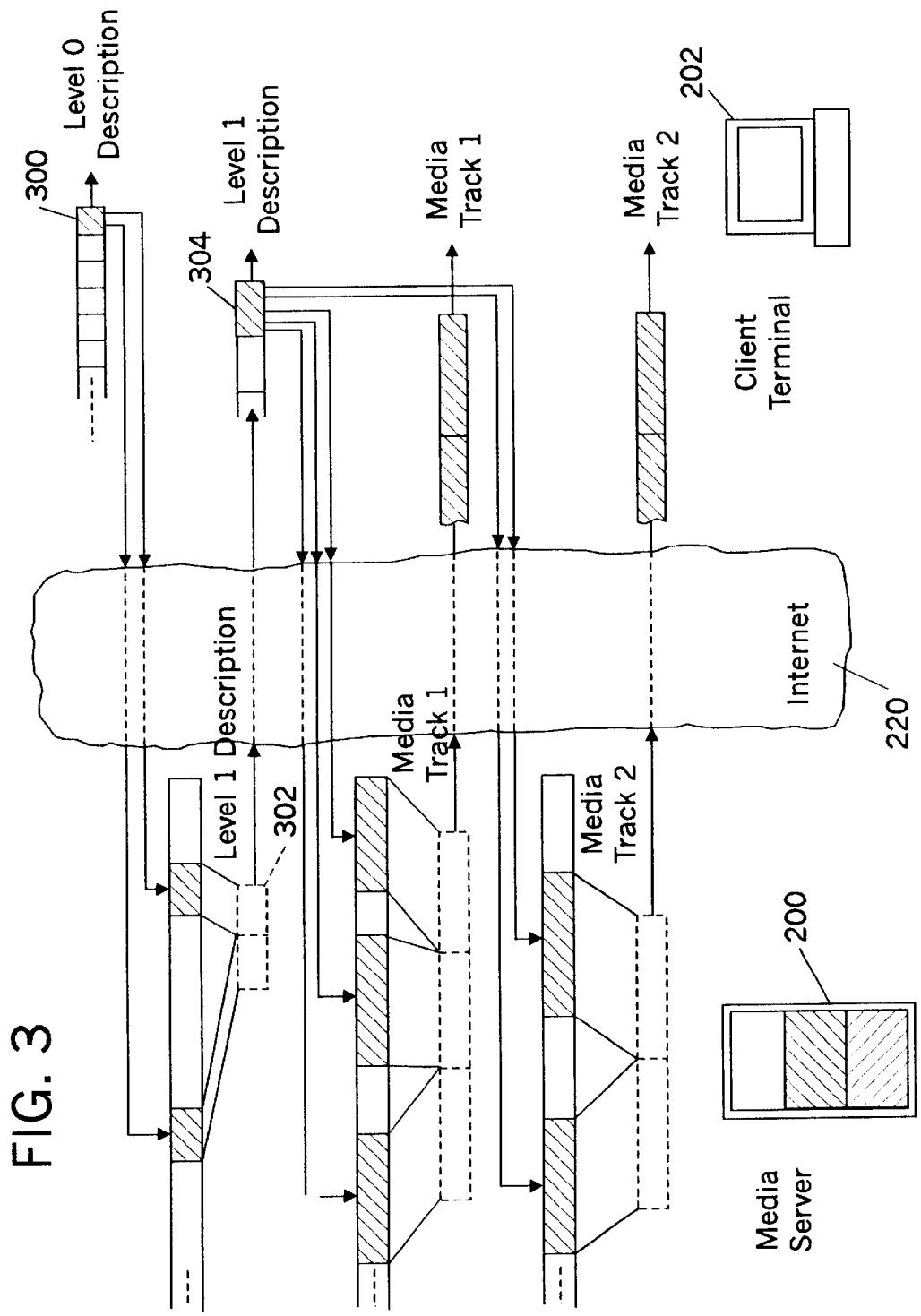
FIG. 3 is a view of the interaction between the client terminal user and network server of FIG. 1.
Figure 4:
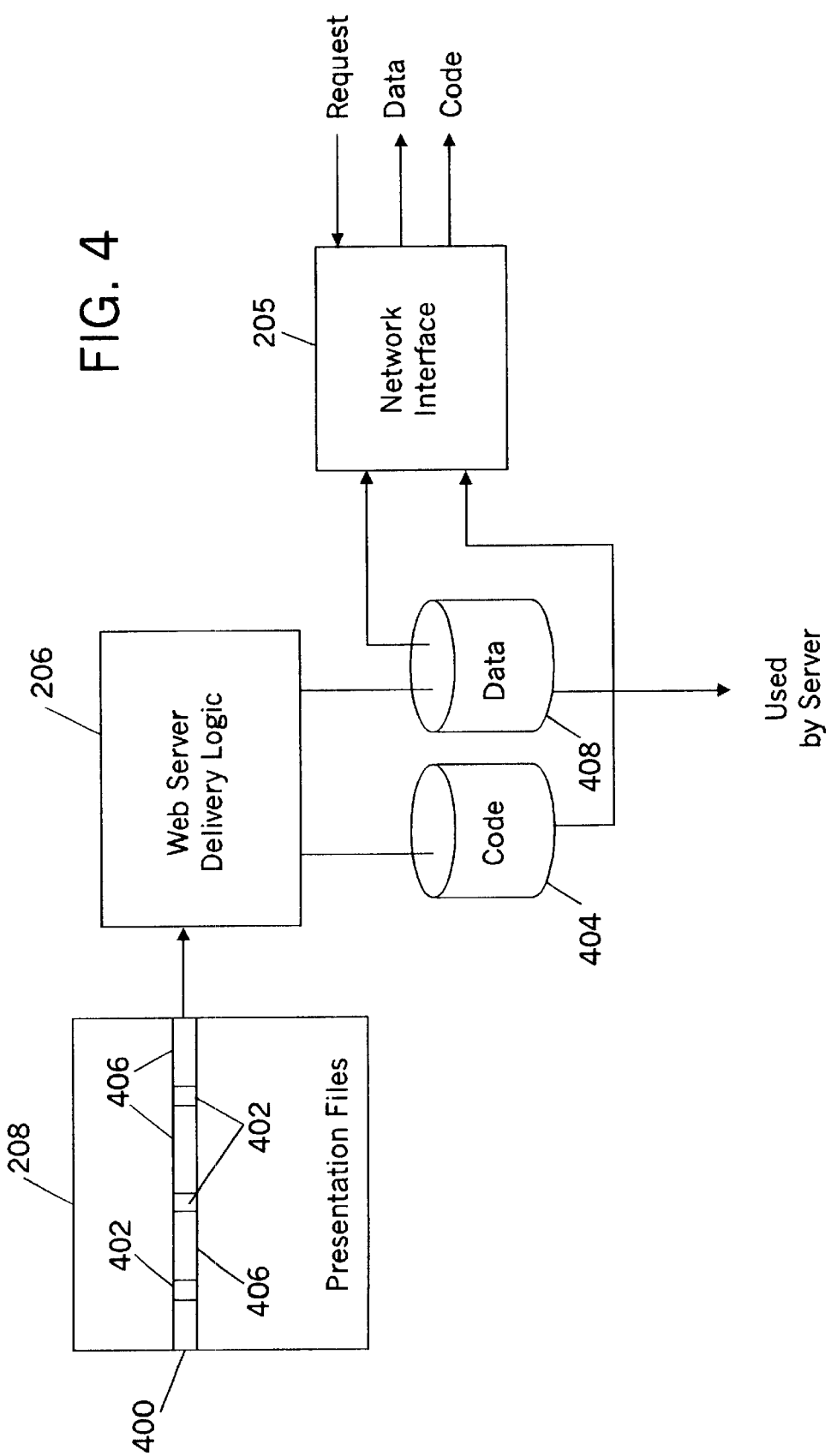
FIG. 4 is a schematic showing the movement of data in the network server.

Referring to FIG. 2, as the network server 200 interfaces with the user's terminal 202 over the internet 201, the user 203 interacts with the visual and audible presentations provided to the terminal 202 by the server 200, and software 204 at the user terminal monitors the user's actions. This software is provided by the network server 200 to the user's terminal 202 when product information is initially requested from the website.

The data obtained by the logic 204 is provided over the internet 201 to the server 200 through its network interface 205. The network interface provides this data to the delivery logic 206 in the modelling interpretation logic 207. If the request can be responded to without interpretations, the request is sent by the delivery logic 206 to the presentation files 208 described in the previously mentioned copending application. The presentation files provide the requested information which is shipped out in packets 209 and 210 to the client terminal. The delivery logic may also obtain requested information through a media server interface 211 from outside media servers 212*a* to 212*n*.

If the request requires interpretation, the network interface provides the information to the modelling interpretation logic 207 which interfaces various software engines 214 to 217 through the non-media engine interface 213. Delivery data is then synthesized for delivery at the network server 200 by putting together in the delivery logic 206 segments from the presentation files 208 and/or media content segments from external media servers 212. The determination as to what the delivery logic 206 should deliver comes from both direct input from the client side through the network interface on content requests, and from the modelling and interpretation logic 207. The modelling and interpretation logic 207 receives all inputs from the user's terminal through the network interface 205, and processes them to provide even more sophisticated responses back to the user in the form of delivery data. To accomplish this, the modelling and interpretation logic not only builds and maintains its own simple session, state and user-model information, but through a non-media engine interface 213 also uses external user-model building, data base search, and statistics gathering engines 214, 215 and 216, respectively.

The modelling interpretation logic 207 takes the user interaction data and provides it to the statistics gathering engine 214 which collates the information provided by the interaction data. The interpretation logic then provides the collated information to the user model building engine 215. The user model building engine analyzes the collated information about the user's actions and builds a model which not only indicates what the user is interested in, but includes an analysis of the user's personal characteristics that will enable modification of the presentation to maintain the user's interest. In addition, the statistical engine 210 can gather user navigational statistics across a multitude of users and derive conclusions about the popularity of products and features. The user model generated by the user model building engine 215 is used by the modelling and interpretation logic 207 in gathering information from the presentation files and outside files to generate a delivery file to transmit to the user over the internet. It is also used by the modelling and interpretation logic to change the rendering of the user's screen and to interrogate the database and search engine 215 of the system. The database search engine 215 provides search results for more complex user queries which are adequately expressed and handled in the rich-media content of the presentation files. Detailed product or feature information which are not expressed in the rich-media content can be obtained from the database search engine and converted by the modelling and interpretation logic 207 to deliverable form to be delivered to the user as presentation data 209.

From the above, it should be apparent that there is a presentation interaction update loop 218 in which the delivery model by which data is delivered and presented to the user is constantly being updated in response to user requests and his response to the material presented.

As shown in FIG. 41 when the user expressed interest in a particular car, such as the BMW sedan discussed in connection with FIG. 1, the file 400 for the BMW is accessed at a single address in the presentation file 208 of FIG. 2 at receipt of a request by the server from the user terminal 202. The files contain a pre-prepared presentation of the BMW which could include descriptions from all levels 0 to 4 of the BMW sedan. This pre-prepared presentation could be augmented by information from media servers and inputs from the non-media servers obtained during previous accesses of the BMW presentations. The delivery logic contains a kernel of code for accessing the presentation files. All other code necessary for the presentation are contained in the BMW presentation file. As shown, code segments 402 of an accessed file are placed in code storage locations 404 of server storage for transmission by the web server upon request by the user. The data segments 406 of the file are placed in data storage locations of the server storage for delivery to the client and/or to be used by the server. Data delivered to the client will depend on the client's initial request and later modifications of that request, as discussed in the aforementioned copending applications.

Referring to FIG. 5, data frames 500, a presentation file 400 is made up of a number of frames. The frames include a file header frame 502 and a End of stream (EOS) frame 510, a thumbnail frame 504, a meta frame 506, a media frame 508. A presentation at minimum must include file header frame 502. The most degenerate but useful version of a presentation file would be a file header frame 502 followed by a thumbnail frame 504. Media frames 508 are included in all other cases. Media frames may include banner, animation or video level information. Meta frames are only present in cases where non-default behaviors and configurations are desired, or in cases where actions and abstract navigational semantics are incorporated.

Figure 6A:
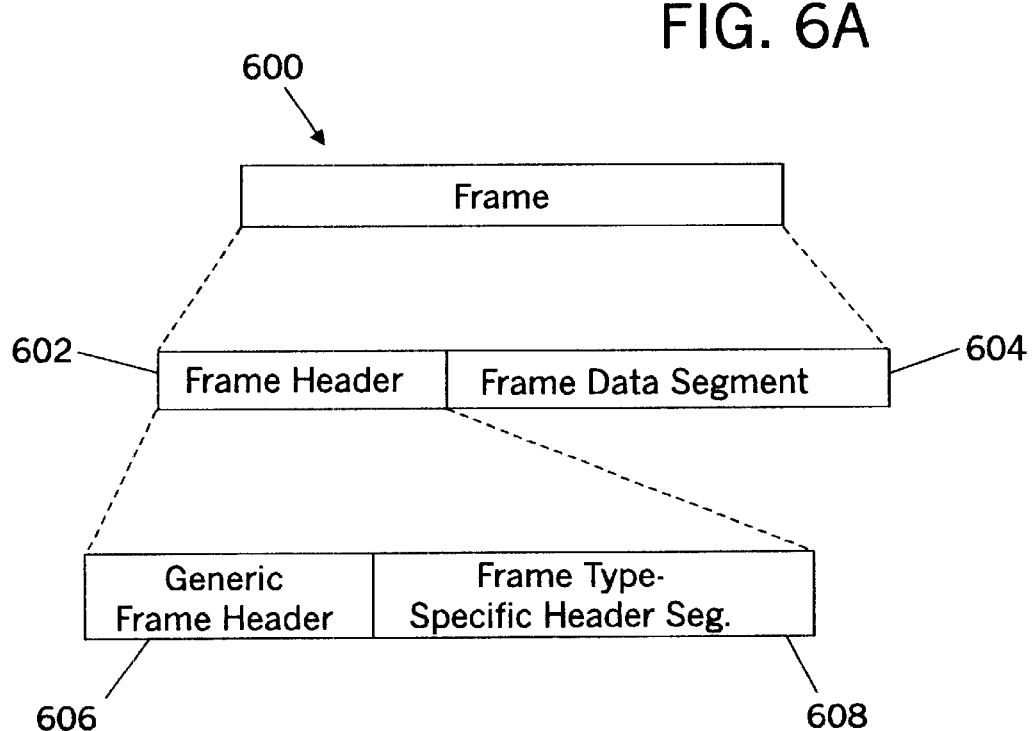
FIGS 6A and 6B are diagram of the general structure of a frame.
Figure 6B:
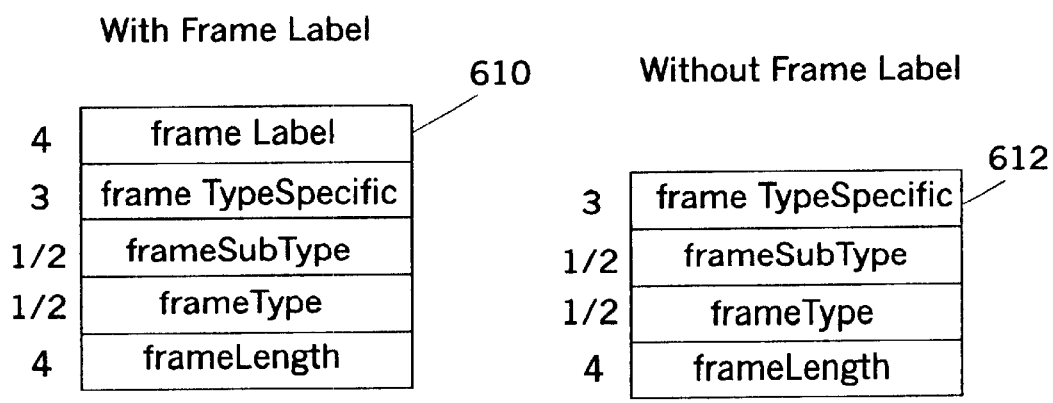

As shown in FIG. 6, all frames 600 have a uniform structure in that they have a frame header 602 followed by a frame data segment 604.

General Structure of Frames

Furthermore, frame headers for all frame types have a uniform and mandatory initial structure referred to as the generic frame header 606. This is followed by an optional frame type-specific header segment 608 whose length is also frame type specific.

The generic frame header may either include a frame label field 610 (as its first field) or not. The default is the lightweight version 612 which does not include the frame label field. When AS the lightweight version is the choice, it is so for every frame in the file and similarly for the non-lightweight version. The label field is 4 bytes long and the rest is 8 bytes, making the generic frame header 12 bytes long for the frame label version and 8 bytes otherwise.

Header Frames

Figure 7:
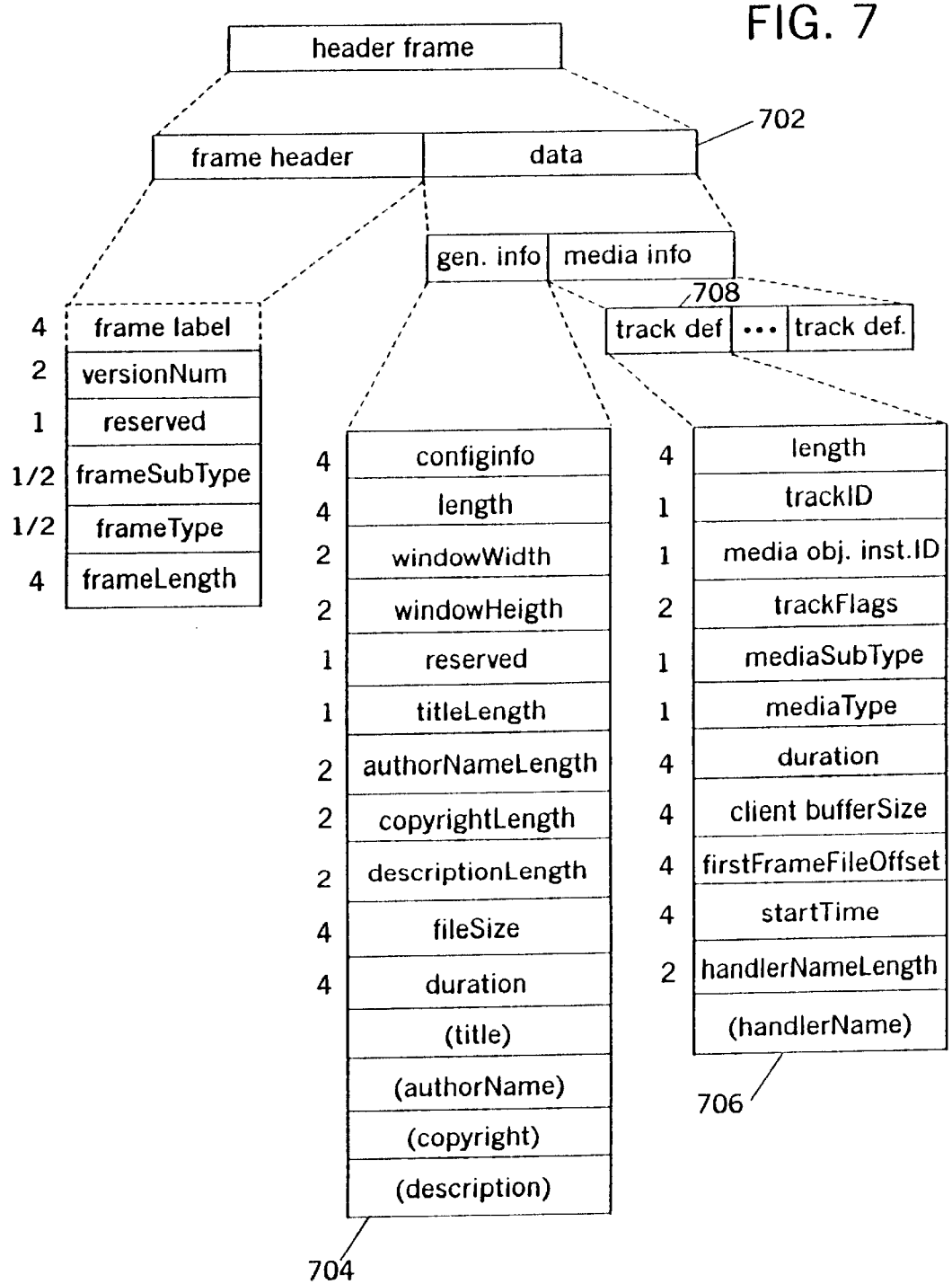
FIG. 7 is a diagram of a file header frame.

The file header frame contains no frame type specific header segment. FIG. 7 illustrates the structure of the file header frame 700 for the case where the sub-type is complete. Among the three bytes in the generic frame header that are frame type specific, the first two bytes in this case carries the version number of the HotMedia format in this file as shown. The third is unused.

The data segment 702 of the file header frame for the sub-type complete consists of a variable size general information segment 704 followed by a variable size general information segment 704 followed by a variable size media information segment 706 as illustrated in FIG. 7.

The General Information Segment

The general information segment 704 contains the following fields in that order.

1. Configurations flags field—4 Bytes.

Bit 1 (1sb)—indicates whether transitions are automatic or user controlled. 1 indicates automatic; 0 user controlled.

Bit 2—indicates whether action frames are present in the file. 1 indicates presence; 0 indicates absence.

Bit 3—indicates whether a thumbnail frame will be present following this file header frame. 1 indicates presence; 0 indicates absence.

Bit 4—indicates whether an explicit user-interface will be present in the client. 1 indicates presence; 0 indicates absence.

Bit 5—indicates whether configuration frames will be present to specify custom explicit user-interfaces. 1 indicates presence; 0 indicates absence. Relevant only when bit 4 above has declared the present of an explicit user-interface in the first place.

Bit 6—indicates whether media frames will be present in this file. 1 indicates presence; 0 indicates absence.

Bit 7—indicates whether a frame label is present as part of every generic frame header in this file. 1 indicates the lightweight version with no frame labels; 0 indicates the non-lightweight version with frame labels.

2. Size of this general information segment—4 Bytes.
3. Width of the application window created to render this file—2 Bytes.
4. Height of the application window created to render this file—2 Bytes.
5. Reserved—1 Byte.
6. Size of file author field in bytes—1 Byte. 0 indicates absence of the file title field.
7. Size of file title field in bytes—2 Bytes. 0 indicates absence of the file title field.
8. Size of the file copyright field in bytes—2 Bytes. 0 indicates absence of the file copyright field.
9. Size of the file description field in bytes—2 Bytes. 0 indicates absence of the file copyright field.
10. Total file size in bytes—4 Bytes.
11. Total playback length in milliseconds—4 Bytes. Relevant only when a temporal aspect is associated with the contents of this file.
12. Optional file author. Size determined by field 6 above.
13. Optional file title. Size determined by field 7 above.
14. Optional file copyright. Size determine by field 8 above.
15. Optional File description. Size determined by field 9 above.

Media Information Segment

The media information segment 706 contains one or more track definition blocks 708. A track definition block defines a media track contained in the file, and for every media track that is encountered in the file by the client, there should be a corresponding track definition block that was previously delivered to it. The track definition block is variable size depending on whether it specifies a track handler object name. An object name is specified for media tracks carrying all media types except for a kernel set that is part of HotMedia.

When it does not specify the track handler name, its size is 24 Bytes. When it contains just the name and/or the code of the track handler object, the size of these fields added on. The code could be specified either as the actual code itself or as a URL reference to the actual code. When present is for server side consumption and the server separates it from the file and forwards only the rest to the client. The track object code is then dynamically delivered to the client just-on-demand.

The track definition block contains the following fields in that order.
1. Size of this track definition block—4 Bytes.
2. A media track ID that is unique for each media track in this file until redefined by a new header frame containing media information—1 Byte.
3. A media object instance ID—1 Byte. A media handler object instance becomes responsible for handling every media track. When multiple media tracks specify the same media handler object type, it may be desirable in certain situations that the same media handler object instance handle multiple such tracks. When the media handler object name and media object instance ID coincide for two tracks, then they are handled by the same media handler object instance.
4. Track related flags—2 Bytes.
   Bit 1 (msb)—indicates whether a media track handler name is specified or not. A value of 1 indicates media track handler name is specified; a value of 0 indicates it is not.
   Bits 4–16—currently unused.
5. Sub-Type of this media track—1 Byte. Represents a sub-type such as JPEG, H.263 etc. Appendix A provides a set of tables (clearly not an exhaustive set) defining the types and sub-types. These tables will grow as we add more types and sub-types.
6. Type of this media track—1 Byte. Represents a type such as image, video, audio, animation, text etc. Appendix A provides a set of tables (clearly not an exhaustive set) defining the types and sub-types. These tables will grow as we add more types and sub-types.
7. Total playback length of this media track data in milliseconds—4 Bytes.
8. Size in bytes of the buffer that the media handler object in the client needs to create to render this media track—4 Bytes.
9. Byte displacement of the first media frame of this media track from the beginning of this HOT MEDIA file—4 Bytes.
10. Start time of this media track in milliseconds in relation to beginning of all playback experience from this media file—4 Bytes.
11. This field is present if and only if the flag in field 4 above has indicated that media track handler name is specified. It carries the size in bytes of the character string carrying the name of the media track handler objects, that follows as the next field—2 Bytes.
12. This field is present if and only if the flag in field 11 above has indicated that media track handler name is specified. It is a character string carrying the name of the media track handler object—size defined by field 10 above.

The data segment of the file header frame for the sub-type media information would consist of only the variable size media information segment. The description of this segment is identical in this case to its description above in the context of the sub-type complete.

Thumbnail Frames

A thumbnail frame 800 contains no frame type specific header segment and therefore has only a generic frame header as illustrated in FIG. 8.

Thumbnail Header Segment

As illustrated in FIG. 8 above, the thumbnail header segment 802 contains the following fields in that order.
1. Optional frame label field—4 Bytes (Double Word).
2. Type/Subtype of the thumbnail image—1 Byte. Refer to the type and sub-type specification for images in Appendix A.
3. Thumbnail frame related flags—1 Byte.
   Bit 1 (sb)—indicates whether an automatic pan is supported on the thumbnail image. 1 indicates support; 0 indicates no support.
   Bit 2—if automatic pan is supported, specifies whether we have a snap pan. 1 indicates snap pan; 0 indicates otherwise.
   Bit 3—if automatic pan is supported, this bit indicates whether pan loops or reverses. 1 indicates looping; 0 user reversing.
   Bit 4—if automatic pan is supported, this bit indicates whether the scroll is in the positive or negative direction. 1 indicates positive; 0 indicates negative.
   Bit 5—indicates whether hotlinking from this thumbnail is supported. 1 indicates supported; 0 indicates not supported.
4. Delay interval for snap pan in a exponential scale. For a value k specified in this field, the delay in milliseconds is computed using the expression $16*(2**k)$—1 Byte. Note that this field is relevant only when the flag value above indicates snap pan enablement.
5. Type/Sub-Type of this frame—1 Byte. The 4 last significant bits of this field specify the frame type. The remaining 4 more significant bits specify the frame sub-type.
6. Total length of this frame in bytes—4 Bytes.

Thumbnail Data Segment

The thumbnail data segment 804 comprises of the following fields.
1. Number of snap frames for snap pan (where enabled)—2 Bytes. Note that the value carried by this field is relevant only when the corresponding flag in the header indicates snap pan enablement.
2. Unused—2 Bytes.
3. Size of the thumbnail image data in bytes—4 Bytes.
4. Thumbnail image data (size defined by field 1 above).

EOS Frames

The End of Stream (EOS) frame 900 signals the end of a HotMedia stream to the client and is a header only frame as illustrated in FIG. 9.

As shown, it contains the following fields in that order.
1. Optional frame label field—4 Bytes (Double Word).
2. Unused—3 Bytes.
3. Type/Sub-Type of this frame—1 Byte. The 4 least significant bits of this field specify the frame type. The remaining 4 more significant bits specify the frame sub-type.
4. Total length of this frame in bytes—4 Bytes.

Media Frames

Figure 10:
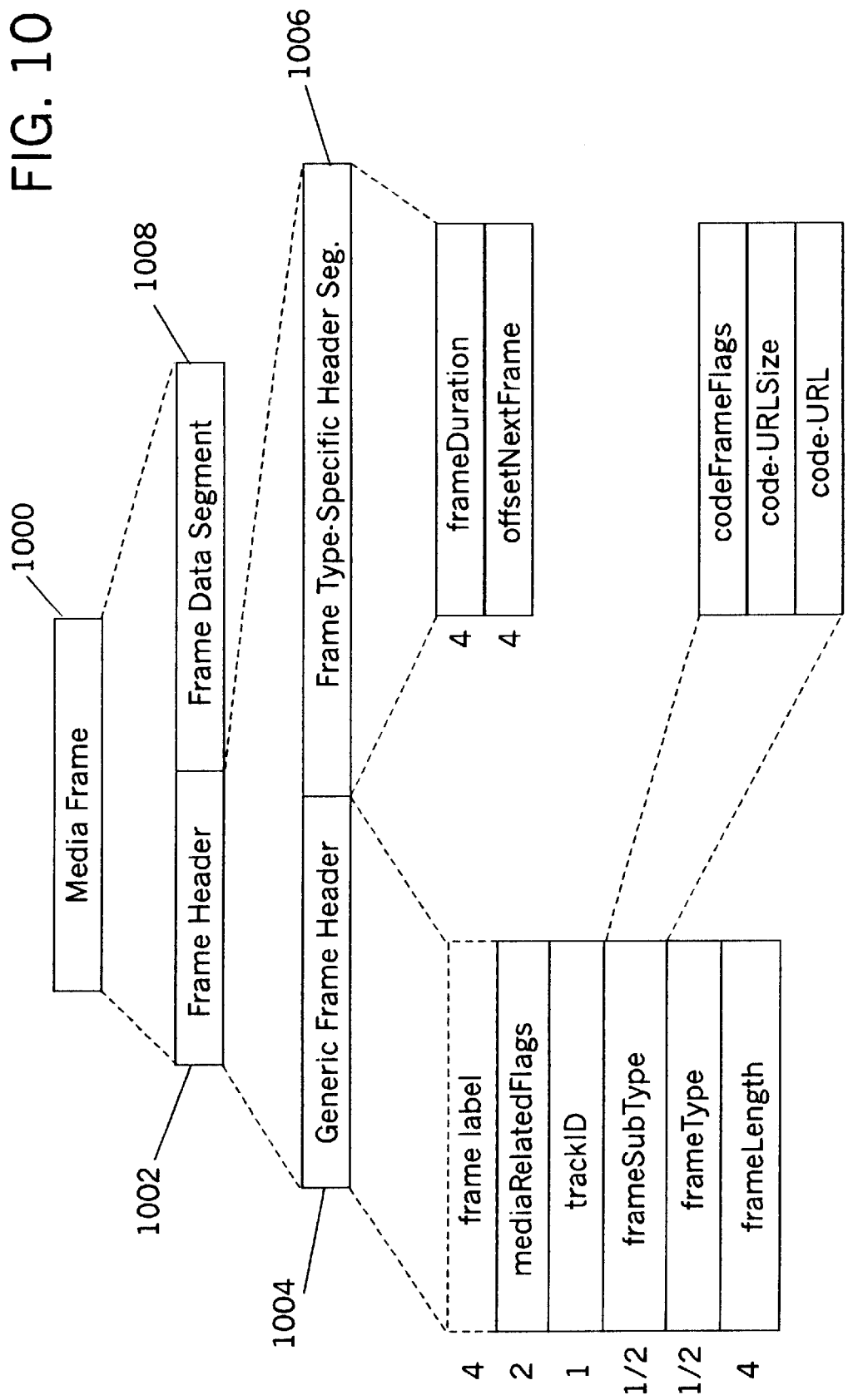
FIG. 10 is a diagram of a Media frame.

As illustrated in FIG. 10, media frames 1000 are the containers for media data which could include, bitstream data, initialization information, behavior information and code. The media frame header and data segments are as described below.

Media Header Segment

A media frame header 1002 contains both the generic frame header 1004 as well as a frame type-specific header 1006 as illustrated in FIG. 10. As illustrated, the generic frame header of the media frame contains the following fields in that order.
1. Optional frame label field—4 Bytes (Double Word).
2. subtype of this media track exactly as described in the track definition block—1 Byte.
3. Media frame related flags—2 Bytes.
4. Type/sub-Type of this frame—1 Byte. The 4 least significant bits of this field specify the frame type. The remaining 4 more significant bits specify the frame sub-type.

| Type | Flag Values |
| --- | --- |
| Media Bit Stream | 0 |
| Initialization | 1 |
| Behavior | 2 |
| Code | 3 |

5. Total length of this frame in bytes—4 Bytes.

The frame type specific header segment for the media frame contains the following two fields.
1. Total playback length of media data in milliseconds in this frame—4 Bytes. Note that this field is relevant only when the flag value above indicates media bit stream.
2. Byte displacement of next frame of this media track in relation to the beginning of this frame—4 Bytes.

Media Data Segment

The contents of the media data segment is determined by the sub-type of the media frame. For the case where the sub-type is bitstream, media bit stream formats are determined by the type and sub-type and are available in the format specification documents of the standards in question (e.g., JPEG, H.263, G.723). The media bit stream format for the type HMORBIT, HMANIMATION, HMGSM and HMIBMPIX are new and is specified in the Appendix B, Appendix c and Appendix D respectively.

Media bit streams in any frame will usually contain whole basic units of the media data although this is not mandated in the HotMedia format. For example, a text frame would usually contain complete words/sentences, GIF and JPEG frames would contain all the data for the image, JPEG Animation and H.263 video frames would contain exactly the data for an integral number of frames, and G.723 Audio frame would contain exactly the data for an integral number of samples. But there are situations where very large JPEG frames for example could be spread over multiple media frames to facilitate multiplexing in delivery.

Similarly, the format for initialization and behavior sub-types are media type specific and therefore will be different for each media type. These are specified in Appendix E, F, G, H and I.

The format for the code sub-type is however media independent and is illustrated in FIG. 9.
1. Code frame flags field—2 Bytes.
   Bit 1 (1.sb)—indicates whether media track handler code included is actual code or a URL reference to the code; 0 indicates code and 1 URL.
2. The size in bytes of the code or the URL as the case may be, that follows as the next field—4 Bytes.
3. Actual code to handle the track data or the URL to the code as the case may be—size defined by field 2 above.

Meta Frames

Meta frames are frames that contain information that concerns hyperlinked behavior, higher level semantics, non-media track specific aspects, overall client behavior/ configuration and so forth. The currently defined sub-types include range meta frames and action meta frames which are described below.

Range Frames

Figure 11A:
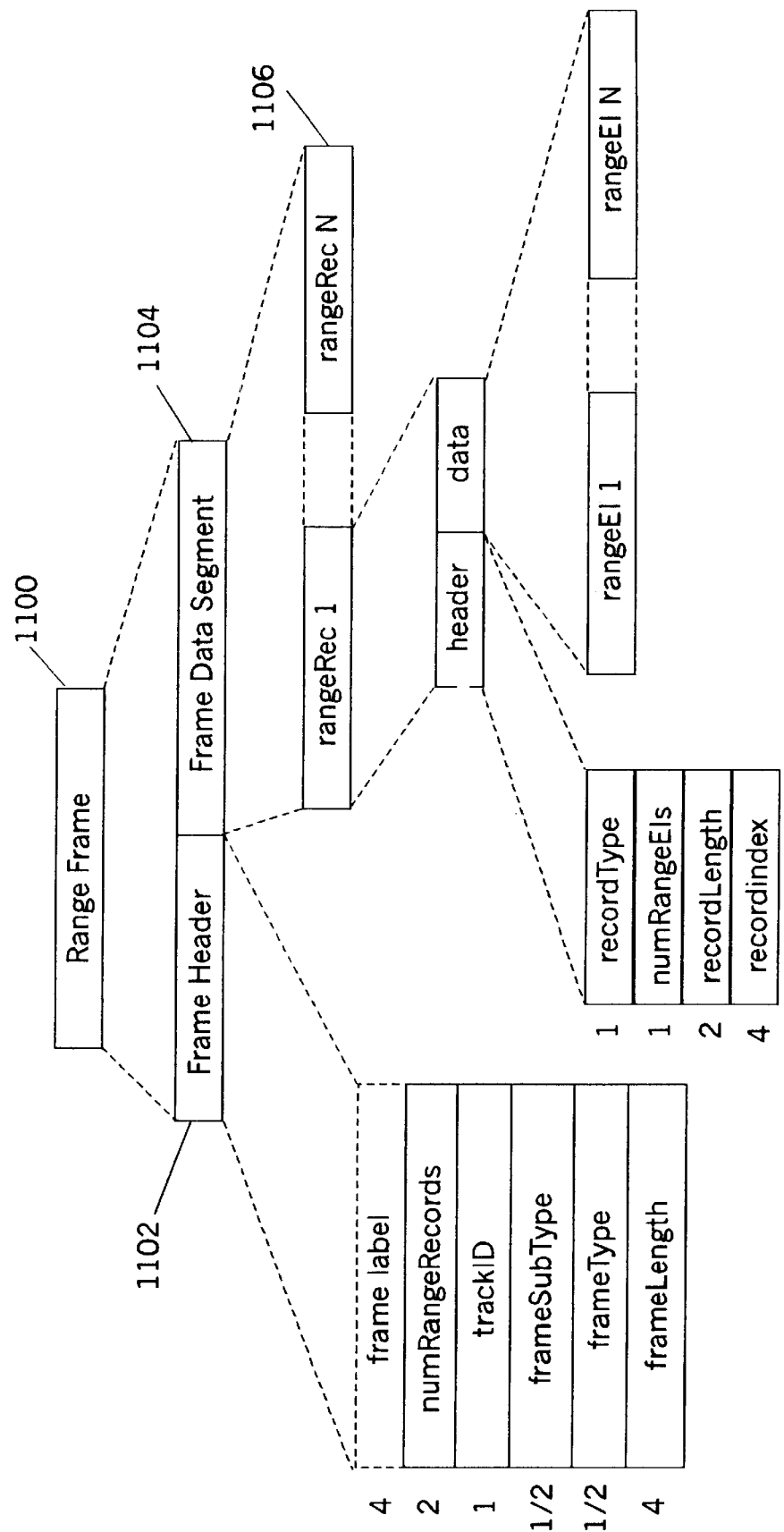
FIGS. 11A and 11B are diagrams of a range frame.

Range frames enable the identification and labeling of spatio-temporal segments of media track data and the association of navigable indices with them. Like all other frames, a range frame contains a frame header segment 1102 and a frame data segment 1104 as illustrated in FIG. 11.

The range frame header has no frame type-specific segment and contains the following fields in that order.
1. Optional frame label field—4 Bytes (Double Word).
2. Number of range records (in the data part)—2 Bytes.
3. The track ID of media stream this range frame is associated with—1 Byte.
4. Type/sub-type of this frame—1 Byte. The 4 least significant bits of this field specify the frame type. The remaining 4 more significant bits specify the frame sub-type.

| Type | Flag Values |
| --- | --- |
| Range | 0 |
| Action | 1 |

5. Total length of this frame in bytes—4 Bytes.

Range Frame Data

The range frame data segment contains a sequence of range records 1106 as illustrated in FIG. 11. The number of range records in the above is determined by field 2 of the range frame header.

Range Records

A range record comprises of a range record header and a range record data segment. The range record data comprises of a sequence of range elements. The 8 Byte range record header contains the following fields:
1. Type of this range record—1 Byte. The type and subset of the values for this case are given below.

| Type | Value |
| --- | --- |
| SPACE | 0 |
| TIME | 1 |
| SPACETIME | 2 |
| ENTIRE | 3 |
| DONTCARE | 4 |

2. Number of range elements (in the data part)—1 Byte.
3. Total length of this record in bytes—2 Bytes.
4. Index of this range record—4 Bytes.
Note: When the range record type is ENTIRE, it stands for the entire spatio-temporal extent of the media track in question. No range elements follow therefore and field 2 above would have the value 0.

Range Element

Figures 11B, 12:
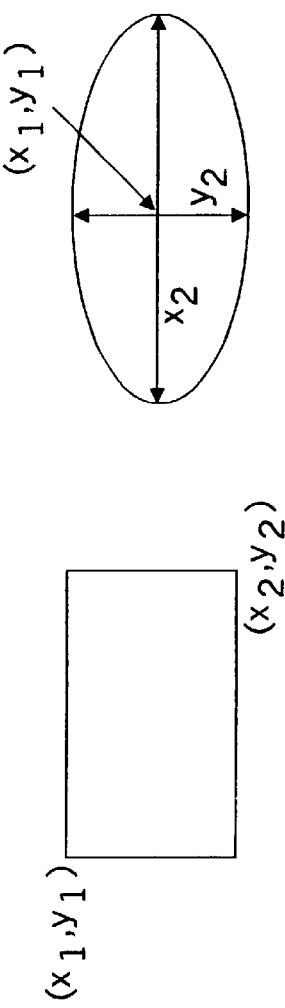
FIG. 12 shows rectangular and elliptical contours.

Range elements are 10 bytes in size and are of two kinds—spatial elements and temporal elements. Both element types have a 2 Byte type and flags field as illustrated in FIG. 11(b).

The fields of the two range element are as follows.
1. Bit 1 (1sb)—indicates whether the element is of type spatial or temporal. 0 indicates temporal and 1 spatial.
2. Bits 2–3—indicates the sub-type of the range. For spatial elements, 0 indicates rectangular, 1 indicates elliptical and 2 indicates polygonal. For temporal elements, 0 indicates time and 1 indicates count.

3. Bit 4—indicates whether this one has a following range element in the sequence. 0 indicates no following range element and 1 indicates a following range element.
4. Bit 5—in case bit 4 indicated a following range element, indicates whether the following one is of type temporal or spatial. 0 indicates temporal and 1 spatial.
5. Bits 5–16—unused.

The remaining 2 fields of the temporal element are defined as below.
1. Temporal lower bound in milliseconds or as an integer frame count—4 Bytes.
2. Temporal upper bound in milliseconds or as an integer frame count—4 bytes.

The remaining 4 fields of the spatial element are defined as below.
1. Spatial value $X_1$—2 Bytes.
2. Spatial value $Y_1$—2 Bytes.
3. Spatial value $X_2$—2 Bytes.
4. Spatial value $Y_2$—2 Bytes.

Various range element combinations are possible expressing a variety of semantics. The simplest are the plain spatial and plain temporal cases signalled by the range record types SPACE and TIME respectively. The plain spatial case is applicable to a media type comprising of a single image with no temporal dimension such as in the example of a panoramic image. There would be just one or more spatial elements here in the range record. When the spatial contour in question is a rectangle or an ellipse, there would be just one spatial element. In the former case, as illustrated in FIG. 12, the four values are utilized to represent the upper left and lower right corners of the rectangle. In the latter case, again as illustrated in FIG. 12, the four values are utilized to represent the center, x-radius and y-radius of the ellipse.

Figure 13:
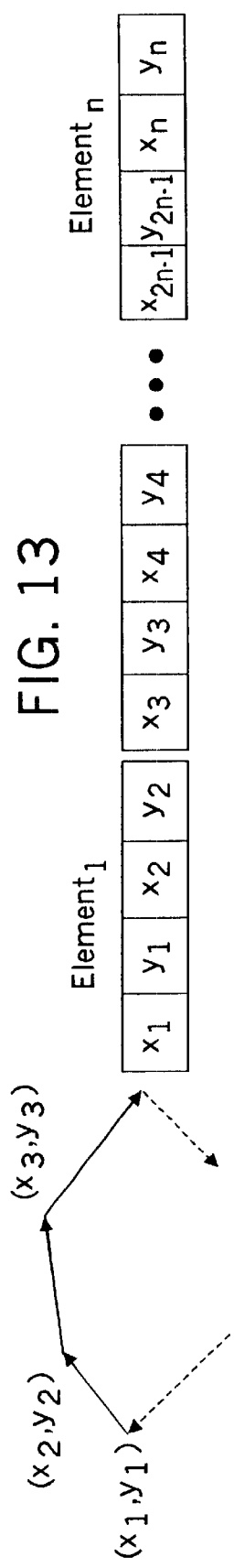
FIG. 13 shows polygonal contours.

When the spatial contour in question is a polygon, there would be multiple spatial elements. The only HotMedia file format restriction is that the polygon have an even number of points. A polygon with 2n points will be specified using n spatial elements. The vertices of this polygon enumerated in a clockwise order starting at any one of them are $(X_1, Y_1), (X_2, Y_2), \ldots (X_{2n}, y_{2n})$. As FIG. 13 illustrates, this will be expressed by n spatial elements.

The plain temporal case is applicable to a media type comprising of multiple discrete images such as in animation or a real time media such as audio or video. There would be just one temporal element here in the range record which will be of sub-type count for a discrete media like animation and sub-type millisecond for a real-time media like audio. The temporal element would contain two values, the first being the temporal lower bound and the second the upper bound. When the media in question has a spatial aspect to it as well, it is assumed that the whole spatial extent of the images are automatically included although not explicitly specified so.

Range record type of SPACETIME combines temporal and spatial elements for more complex semantics. The simplest case here would be a single temporal element followed by one or more spatial elements defining a simple or polygonal spatial contour as the case may be. The semantics is that of the spatial contour specified applying across the entire temporal range to form a spatio-temporal group. The most common example would be a single temporal element followed by a single spatial element where the spatial contour is rectangular or elliptical. The more complex case of SPACETIME records would have multiple temporal-spatial element sets as illustrated in FIG. 14.

Figure 14:
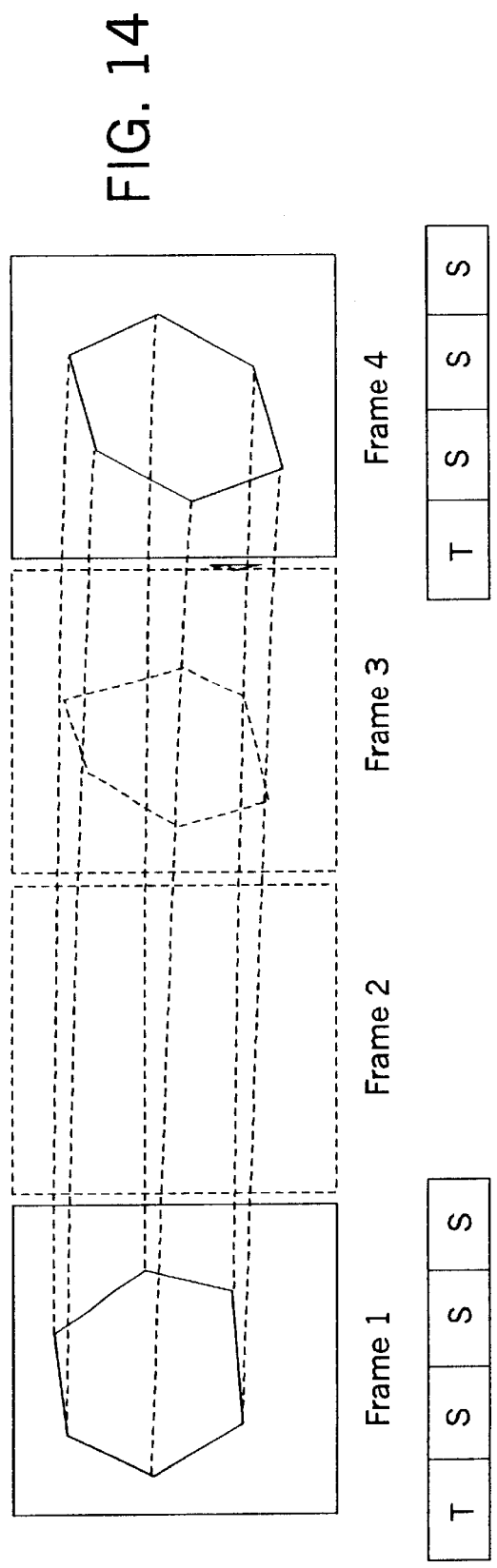
FIG. 14 shows interpolated contours.

As FIG. 14 illustrates, there are two temporal-spatial element sets, one corresponding to the temporal range comprising frame 1 and the second corresponding to the temporal range comprising frame 4. The power of the specification lies in the fact that frame 2 and frame 3 are implicitly in the group. The spatial contour for frames 2 and 3 are determined by linear interpolation of the spatial contours for frames 1 and 4 as illustrated. The important constraint here is that every set must specify spatial contours with equal number of vertices. Note that even with this restriction, by making vertices coincide one can move between polygons with unequal number of vertices. For real time media where the temporal intervals are specified in milliseconds, similar interpolation applies for the interval in the middle.

Action Frames

Action frames associate user interaction semantics beyond simple navigation with the media tracks. They enable the specification of hot-linking, transitions, media-based selection and abstract navigation.

Figure 15:
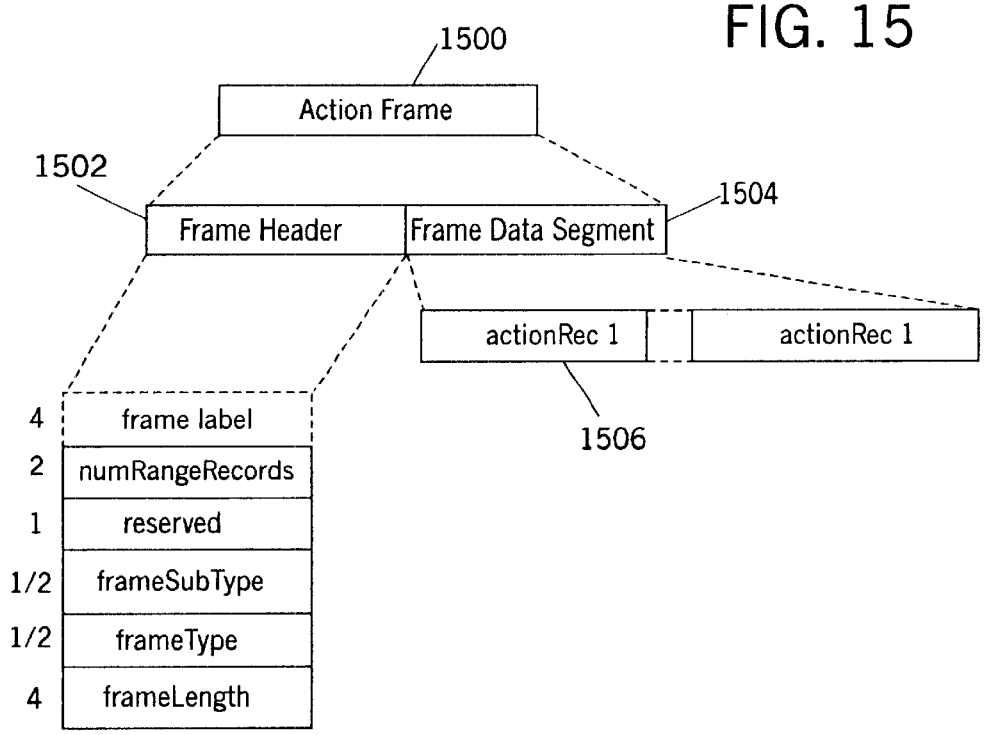
FIG. 15 shows an action frame.

An action frame 1500 is made up of a frame header segment 1502 and a frame data segment 1504 as illustrated in FIG. 15.

Action Frame Header

The action frame header has no frame type-specific header segment and contains the following fields in that order.
1. Optional frame label field—4 Bytes (Double Word).
2. Number of range records (in the data part)—2 Bytes.
3. Reserved—1 Byte.
4. Type/Sub-type of this frame—1 Byte. The 4 least significant bits of this field specify the frame type. The remaining 4 more significant bits specify the frame sub-type.

| Type | Flag Values |
| --- | --- |
| Range | 0 |
| Action | 1 |

5. Total length of this frame in bytes—4 Bytes.

Action Frame Data

The action frame data segment 1504 as shown in FIG. 15, contains a sequence of action records 1506. The number of action records in the above is determined by field 3 of the action frame header.

Action Records

Figure 16:
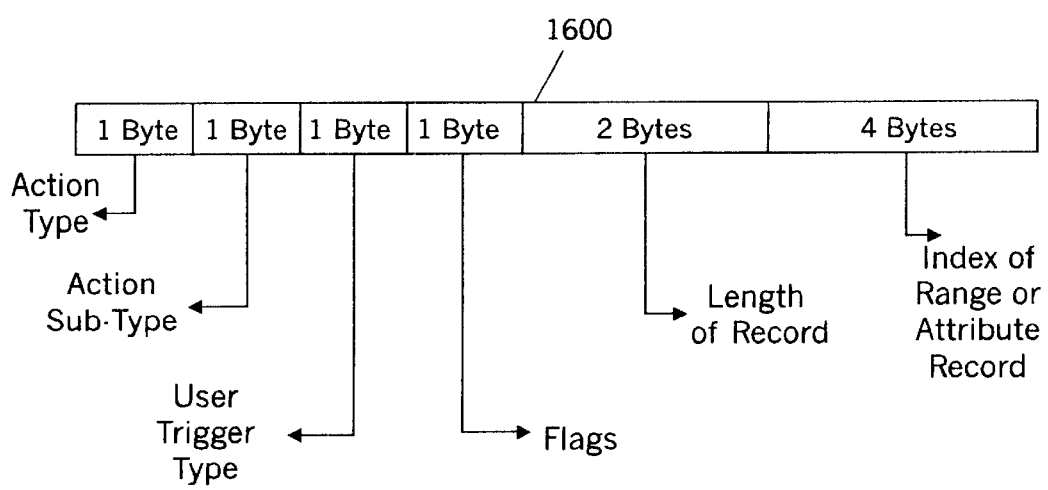
FIG. 16 shows an action frame record header.

An action record comprises of an action record header and an action record data. The 10 Byte action record header is as shown in FIG. 16.

The action record header 1600 as shown has the following 15E fields:
1. Type of this action record—1 Byte. Appendix J specifies a subset of the possible types, sub-types and their relevant action parameters.
2. Sub-type of this action record—1 Byte. This is dependent on the type field above and refer to Appendix J again for possible entries.
3. User trigger type—1 Byte. Appendix K specifies a subset of the possible types for user triggers.
4. Record related flags—1 Byte.
   Bit 1 (1sb)—indicates whether this action record is associated with an attribute record or a range record. 0 indicates attribute and 1 range.
   Bit 2—indicates whether a user trigger is specified or not in this action record header. 0 indicates absence and 1 indicates presence.
   Bit 3—indicates whether a user trigger related parameter is present or not in the parameter segment of this action record. 0 indicates absence and 1 indicates presence.

Bit 4—indicates whether an action index block is present following the action parameter block that immediately follows this action record header. 0 indicates absence and 1 indicates presence.

Bit 5—indicates whether an action index block when present contains the index of this action record or is a reference to some other action record. 0 for the index of this action record and 1 for a reference to another action record. When this value is a 1, this action record will have no action parameter block following it.

Bit 6—indicates whether a handler specification block follows is present following the action parameter block that immediately follows this action record header or not. 0 indicates absence and 1 indicates presence. If an action index block is present, this block would follow it.

Bit 7—signals the invalidity of the total size field that follows in this action record header. 0 indicated valid; 1 indicates invalid. When invalid, the size is computed using the size specifications in the optional blocks that follow.

Bit 8—Unused.

5. Total length of this record in bytes—2 Bytes.
6. Index of the attribute or range record this action frame is associated with—4 Bytes.

The action record data consists of an optional action parameter block, an optional action index block and an optional handler specification block in that order. The presence of these optional blocks is determined by the flags in the action record header as already described.

Action Parameter Block

The content of the action parameter block is specific to the type and sub-type of the action frame. The very first field of the action parameter block is always a 2 Byte length field which provides the length of the action parameter block in bytes. Appendix J describes the action parameter block for various is action types.

Action Index Block

This block has just one 4-byte field containing an integer value. This block is present only when bit 4 in the flags field of the header is set to 1 as described previously. The value it carries will be the index of this action record when bit 5 in the flags field of the header is set to 0 and will be a reference to some other action record when bit 5 is set to 1.

Handler Specification Block

This block is present only when bit 6 in the flags field of the header is set to 1 as described previously. This block has the following fields.

1. Handler related flags—2 Bytes.

Bit 1 (1sb)—indicates whether handler code has been included or not. A value of 0 indicates code is not included; 1 indicates it is included.

Bit 2—indicates whether handler code when included is the actual byte code or a URL reference to the class; 0 indicates byte code and 1 indicates URL.

2. The size in bytes of the character string carrying the name of the handler object, that follows as the next field—2 Bytes.
3. The character string carrying the name of the media track handler object—size defined by field 2 above.
4. This field is present if and only if the flag in field 1 above has indicated that handler code is included. It carries the size in bytes of the byte-code data or the URL as the case may be, that follows as the next field—4 Bytes.
5. This field again is present if and only if the flag in field 1 above has indicated that handler code is included. It carries the actual byte-code to handle the track data or the URL to the class as the case may be—size defined by field 4 above.

Above we have described one embodiment of the present invention which allows the expression of business actions to rich media presentations. A number of modifications and improvements may be made in this embodiment by those skilled in the art. Therefore it should be understood that the scope of the invention is not limited to this described embodiment but encompasses the scope and spirit of the appended claims.

We claim:

1. A method of providing media presentations from a server to a user's terminal over a network comprising:

maintaining in a single file a presentation containing data for presenting multiple media descriptions of an object contained in a plurality of data frames interspersed with software segments for use in the server and the user's terminal to render the presentation;

accessing the file at a request from a user's terminal separating the software segments from the data frames;

transmitting to the user's terminal at least two data frames, one being a file header frame identifying the presentation and another being one containing one of the media descriptions of the object;

providing certain of the software segments to the user's terminal for interpreting the file header frame and rendering the one media description;

using meta data frames to establish a semantic relationship that allows dynamic delivery of semantically related data segments; and retaining other data frames and related software segments of the presentation at the server until requested by the user's terminal.

2. The method of claim 1 including interrelating business and media process to trigger a business reaction to a media process action.

3. The method of claim 1 including identifying the type of data frame and its content in a header for the frame.

4. The method of claim 3 including using the file header frame to identify the content of the file, its length and various media types contained in the file.

5. The method of claim 4 including providing multiple media frames containing in whole or in part one of a still, animated or full video description of the object.

6. The method of claim 1 including meta data frames to insert media related indices that allow search and retrieval using queries based in terms of media descriptions.

7. The presentation file of claim 6 wherein each frame contains a header for the frame that identifies the type of data in the frame.

8. The method of claim 6 including labeling media and meta frames to comprise semantically related groups.

9. The presentation file of claim 8 wherein one of the frames is a file header frame which identifies the content of the file, the files length and the various media types contained in the file.

10. A presentation file format for use in the rendering of media descriptions on a network, a presentation stored in a single presentation file containing multiple media descriptions arranged in multiple data frames interspersed with software segments and having meta data frames to establish a semantic relationship that allows dynamic delivery of semantically related data segments, said file being configured for:

separating the software segments from the data frames;

providing certain of the software segments to a user's terminal for interpreting the file header frame and rendering one of the media descriptions; and retaining other data frames and related software segments of the presentation at the server until requested by the user's terminal for use by a network server and a user's terminal to render the presentation.

11. The presentation file of claim 10 including multiple media frames each containing one of a still, animated or full video description of an object rendered in whole or in part by the media frame.

12. The presentation file of claim 10 wherein the software that will render media segments is contained in and specified by name in the same file.

13. The presentation file of claim 10 including an implicit specification in the presentation file of the order in which software for various media segments in it is fetched from the server and executed.

14. The presentation file of claim 10 including a new header and different frame displacement values on a segment of a previously created file to create a new entity.

15. The presentation file of claim 10 including meta data frames for providing to the user's terminal descriptions and business related attributes about a product or device described in a media by media frames.

16. The presentation file of claim 15 including meta data frames for providing to the user's terminal new descriptions or business related attributes that represent on the fly replacements to previously communicated descriptions or attributes.

17. The presentation file of claim 10 including media frames for providing to the user's terminal new behavior information intended to dynamically change a presentations behavior at the user's terminal.

18. The presentation file of claim 10 including meta data frames for providing to the user's terminal descriptions of spatio-temporal contexts in the presentation of media.

19. The presentation file of claim 18 including meta data frames carrying descriptions of actions that are linked to meta data frames carrying descriptions of spatio-temporal contexts for performing a described action at the user's terminal in connection with a linked context.

20. The presentation file of claim 19 including software for performing an action on the user's terminal in response to a pre-specified user interaction that acts as a trigger.

21. The presentation file of claim 20 including means for dynamically fetching from the network server the software for performing the action.

22. The presentation file of claim 21 wherein the software for performing the action is specified by name in a meta frame describing the action.

23. The presentation file of claim 22 wherein the action is business related, commerce related or information gathering related.

24. The presentation file of claim 21 wherein the software performing the action includes parameters and data to link the action to the context.

* * * * *